UNITED STATES PATENT OFFICE.

ANSON GARDNER BETTS, OF TROY, NEW YORK.

PROCESS OF TREATING NICKEL ORES.

No. 923,005.  Specification of Letters Patent.  Patented May 25, 1909.

Application filed February 23, 1909. Serial No. 479,475.

*To all whom it may concern:*

Be it known that I, ANSON GARDNER BETTS, a citizen of the United States, residing at Troy, in the county of Rensselaer and State of New York, have invented certain new and useful Improvements in Processes of Treating Nickel Ores, of which the following is a specification.

This invention relates to the smelting of ores containing nickel and the refining of the product of smelting.

The principal object of my invention is to provide an economical method of recovering copper or precious metals present in nickel ores, and cheapening the manufacture of nickel steel as a product of nickel ore. These objects I achieve by smelting the ore, after roasting in the case of a sulfid ore, with the addition of iron ore if necessary, into a crude nickel-iron alloy, containing any copper or precious metal of the ore, and electrolytically refining the alloy, for the production of purified nickel-iron cathodes, which may then be converted into high grade nickel-steel by melting with the proper additions.

Hitherto it has been the practice in producing nickel to throw away the usual large quantity of iron in the ore, as completely as possible with not too great loss of nickel, the aim being to make as pure a nickel as possible, which is then added to iron to make nickel steel. I have found that nickel-iron alloys can be refined in a similar manner to the electrolytic refining of nickel or iron alone, depositing on the cathodes nickel-iron alloy. Copper, silver, gold, platinum, etc., in the crude alloy remain as an anode slime, from which the valuable metals may be readily recovered.

The electrolyte is a solution containing the chlorids, sulfates, fluosilicates or other suitable salts of both nickel and iron. To start with, a solution of the iron salt may be used alone, when iron deposits on the cathodes in greater proportion than it dissolves from the anodes, until equilibrium is reached.

Cobalt may also be precipitated with iron, or with nickel and iron, if it is present in the anode. Refined cobalt-iron alloy may be produced in an analogous manner from a crude cobalt-iron anode. These three metals constitute the iron group as that term is used in the appended claims.

I am aware that crude nickel unavoidably containing some iron has been made by smelting nickel ores, and the metal has been electrolytically refined perhaps producing a cathode metal containing as an undesired impurity a few per cent. of iron, but I do not believe that nickel-iron cathodes have been produced in this way containing as much as say 20% of iron, with the iron present as an intentional and desired constituent. There is a tendency to deposit an alloy with about 3 parts of iron to 1 part of nickel, if the solution contains plenty of each metal, and it is in motion.

What I claim as new and desire to secure by Letters Patent, is:—

1. The process of treating nickel ores which consists in smelting the ore to an alloy of iron and nickel containing a considerable proportion of iron, and electrolytically refining the alloy, with a solution containing a nickel and an iron salt as electrolyte, producing refined nickel-iron cathode metal containing more than 20% of iron.

2. The process of treating nickel ores which consists in smelting the ore to an alloy containing iron and nickel with considerable iron, electrolytically refining the alloy using a solution containing a salt of each metal as electrolyte, producing refined nickel-iron cathode metal, and recovering valuable metals from the anode slime.

3. The process of treating an ore containing a metal of the iron group, which consists in smelting to an alloy with another metal of the iron group, and electrolytically refining the alloy, using an electrolyte containing a soluble salt of each of such two metals, and producing a refined alloy containing the said two metals.

4. The process of treating nickel ores which consists in smelting to an alloy containing iron, copper and nickel, electrolytically refining the alloy with a solution of a nickel and an iron salt as electrolyte, recovering copper from the anode residue, and nickel and iron as nickel-iron cathode metal.

5. As a new product, a cathode deposit of nickel and iron containing about 3 parts of iron to 1 part of nickel.

6. The herein described process, consisting in electrolyzing iron-nickel alloy containing a considerable proportion of iron in an electrolyte containing in solution a nickel and an iron salt, producing refined nickel iron cathode metal containing more than twenty per cent. of iron.

7. The herein described process of refining crude alloy containing metals of the iron group, consisting in electrolyzing the said alloy in an electrolyte containing a soluble salt of each metal, producing a refined alloy containing the metals.

In testimony whereof I have signed my name to this specification in the presence of two subscribing witnesses.

ANSON GARDNER BETTS.

Witnesses:
ETHEL B. BARNHISEL,
FREDERICK CLARK.